Patented Apr. 14, 1936

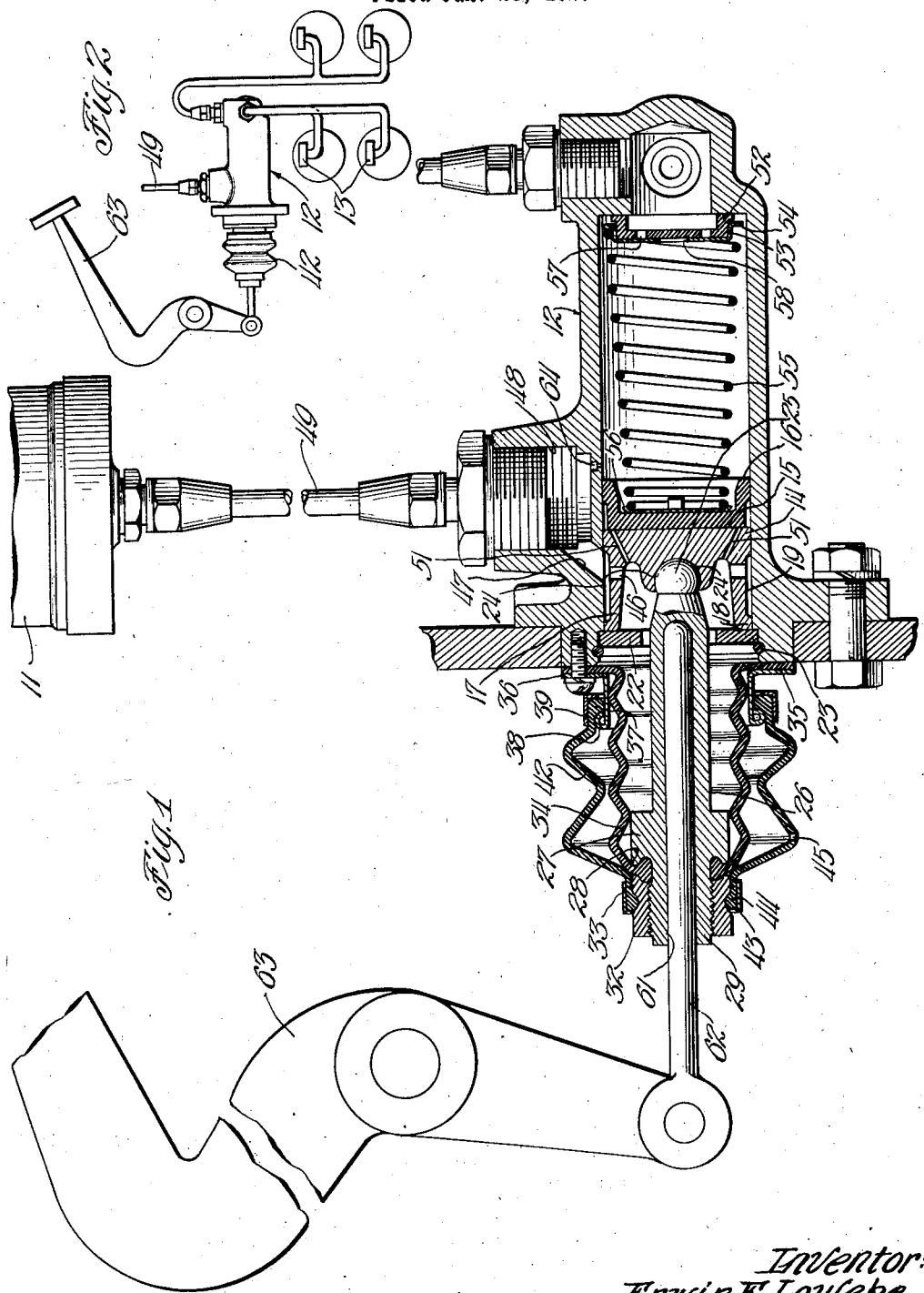

2,037,474

UNITED STATES PATENT OFFICE 2,037,474

HYDRAULIC BRAKE

Erwin F. Loweke, Detroit, Mich., assignor to Hydraulic Brake Company, Detroit, Mich., a corporation of California Application January 26, 1929, Serial No. 335,286

3 Claims. (Cl. 60—54.6)

My invention relates to a hydraulic brake system and more particularly to an improvement in the master cylinder for a hydraulic brake system.

One of the problems encountered in a hydraulic brake system is to provide means for effectively preventing air from entering the system for the reason that air being high compressible detrimentally affects the operation of the system. In those types of hydraulic brake systems in which the master cylinder is not submerged in the brake fluid the most difficult point at which to seal the system against the admission of air has been at the piston which is engaged at its rear side by the piston actuating mechanism.

An object of the invention is to provide an improved hydraulic brake system.

A further object is to provide a master cylinder having means for preventing the admission of air into the cylinder.

A further object is to provide a master cylinder having means for sealing the piston from the atmosphere and at the same time subjecting the rear side of the piston to atmospheric pressure.

A further object is to provide an improved means for actuating the piston of the master cylinder.

Other objects and advantages will appear as the description proceeds.

In accordance with the general features of the invention, a movable piston is mounted in the master cylinder and a flexible boot encloses the end of the cylinder and the rear side of the piston forming a fluid chamber in which the fluid is maintained under a constant predetermined pressure.

Referring to the drawing:

Fig. 1 is a longitudinal section of the master cylinder assembly, and

Fig. 2 is a schematic view of the master cylinder and the wheel brake cylinders, illustrating the manner of connecting the wheel brake cylinders to the master cylinder.

The invention comprises, in general, a fluid reservoir 11, master cylinder 12 and wheel brake cylinders 13. The master cylinder has a piston 14 reciprocably mounted therein. The piston comprises a face portion 15 adapted to carry a packing cup 16 and a rearwardly extending flange 17 spaced from the cylinder wall. The end of the rearwardly extending flange 17 has a radial flange 18 which contacts with the cylinder wall to guide the piston in the cylinder, forming an annular recess 19 around the piston.

A ring 22 is retained in the end of the cylinder by a split ring 23 and is adapted to limit the rearward movement of the piston. The piston is also provided with a socket 24 which engages a ball 25 of a plunger 26 by means of which the piston may be moved. Plunger 26 is provided at its opposite end with an annular ring 27 having an under cut shoulder 28. The end 29 of the plunger is threaded and is adapted to receive a nut 32 having a similar under cut shoulder 33.

Shoulders 28 and 33 are adapted to engage the annular beaded end of a boot 34 of rubber or any other suitable material which surrounds the plunger. The front end of the boot is formed into a radial extending flange 35 which is held against the cylinder by a ring 36. Ring 36 has a cylindrical portion 37 integral therewith and extending rearwardly, which is provided at its end with an annular bead 38.

A collar 39 serves to retain the enlarged annular end of a second boot 42 retaining this end in firm engagement with the annular bead 38. The opposite end of boot 42 is secured to the nut 32 by a collar 43, the nut being provided with a suitable groove for receiving the enlarged annular end portion of boot 42. Boot 42 may be made of any suitable flexible material which is not attacked by the mineral oils used for lubricating vehicles. A suitable material for this purpose is impregnated airplane cloth or leather. Boot 42 thus serves to protect the flexible boot 34 from oils and dust and other matter which might be injurious thereto. Boot 42 is provided at its lower side with an aperture 45 connecting the interior of the boot with the atmosphere.

The rearwardly extending flange 17 of the piston is provided with apertures 46, and the wall of cylinder 12 is provided with an aperture 47 leading into the space 48 which is in communication through a tube 49 with the fluid reservoir. Thus fluid from the reservoir passes through tube 49, space 48, the aperture 47 into the annular recess 19 of the piston and through passages 46 in the piston into the flexible boot 34, which forms a fluid chamber enclosing the rear side of the piston.

The face of the piston is provided with a plurality of passages 51 which extend into the space in the cylinder. During the forward movement of the piston these passages are covered by the packing cup 16 causing a fluid pressure to be produced in the master cylinder.

At the discharge end of the cylinder is a valve comprising a resilient cup-shaped valve member 52 adapted to rest against the valve seat formed by the end of the cylinder wall. Surrounding the resilient member 52 is a cup-shaped rigid valve member 53 having a radially extending annular flange 54. A spring 55 is interposed between the piston and the valve resting at one end against a washer 56 engaging the packing cup 16 and at the other end against the annular flange of the rigid valve member 53, urging this member forward and yieldingly retaining the resilient member 52 against its seat. The yielding valve member 52 is provided with a plurality of apertures 57 and the rigid valve member 53 is provided with a central aperture 58.

As the piston 14 moves forwardly producing a fluid pressure in the cylinder, fluid passes through aperture 58 forcing the central portion of the yielding valve member 52 away from the rigid valve member and allowing the fluid to pass through apertures 57 to the wheel brake cylinders to apply the brakes.

Plunger 26 is provided with a cylindrical bore 61 into which a connecting rod 62 pivotally attached to the end of pedal 63 projects. This construction causes the depression of the pedal to produce a positive movement of the piston in its forward direction. However, upon release of the pedal and its return to its normal position, the piston will not be positively withdrawn but instead connecting rod 62 will be withdrawn from plunger 26, the retraction of the piston being caused by spring 55. During the retraction of the piston the valve in the end of the cylinder will be yieldingly urged to its seat by the spring to maintain a positive pressure in the wheel brake cylinder and the fluid lines leading thereto.

The amount of positive pressure in the wheel brake cylinders will depend upon the relative sizes of the valve and the piston. Since the rear side of the piston is subjected to atmospheric pressure, the valve may be made of such a size as to maintain a pressure of six pounds above atmospheric pressure in the wheel brake cylinders.

Retraction of the piston produces a low pressure in the master cylinder, causing the packing cup to become unseated and allowing fluid from the rear side of the piston to pass through passages 51 into the master cylinder.

It will be noted that it is impossible for a low pressure to be produced in the chamber formed by flexible boot 34 since any depletion of the liquid therein will merely cause a contraction of the boot corresponding to the reduction in the volume of the boot without resulting in a low pressure therein. Furthermore, the fluid chamber formed by the boot is constantly in communication with the fluid reservoir to supply additional fluid thereto.

When the piston arrives in its retracted position there will be an excess of fluid in the master cylinder due to the fact that the fluid will continue to enter the cylinder from the wheel brake cylinders after the piston is retracted. The excess fluid which is present in the cylinder may escape through a passage 64 in the upper wall of the cylinder located immediately in front of the retracted position of the piston. Thus upon each application of the brakes an excess of fluid will be provided in the master cylinder, due to a low pressure therein. However, the valve at the exit of the cylinder and the boot at the rear side of the piston enclosing the other end of the cylinder effectively prevent the low pressure in the master cylinder from extending to any point at which there is a possibility of air being drawn into the brake system.

Having described the nature and embodiments of my invention, what I claim and desire to secure by United States Letters Patent is as follows:

1. In a hydraulic brake system, a master cylinder, a piston movable therein and having an annular recess, a fluid reservoir communicating with said recess, and a flexible boot enclosing the end of the cylinder, said piston having an aperture interconnecting the boot with the annular recess and the reservoir.

2. In a hydraulic brake system, a master cylinder, a piston movable therein comprising a cylindrical portion having an annular recess and provided with an aperture through its wall, and a face portion having a passage therethrough connecting the cylinder with the interior of the piston, a boot enclosing the rearward end of the piston, a fluid reservoir communicating with the boot through the recess of the piston and with the cylinder at a point immediately in front of the retracted position of the piston, a packing cup carried by the piston face adapted to close the passage in the face of the piston during the compression stroke of the piston and uncover said passage in the retractile stroke to allow fluid to enter the cylinder therethrough.

3. In a hydraulic brake system, a master cylinder, a piston reciprocable therein, a flexible boot forming a variable volume fluid chamber rearwardly of the piston, a fluid reservoir, means establishing a fluid connection between the fluid chamber and the reservoir, means for moving the piston forwardly to produce a fluid pressure, securing means for the flexible boot on the cylinder and the means for moving the piston, a valve at the forward end of the cylinder for retarding the return of fluid to the cylinder, means for retracting the piston producing a low pressure in the cylinder, and means for establishing a fluid communication between said chamber and the cylinder during the retractile movement of the piston allowing fluid to enter the cylinder from said chamber, said cylinder having an aperture immediately in front of the retracted position of the piston to allow excess fluid to escape from the cylinder.

ERWIN F. LOWEKE.